United States Patent
Kim et al.

(10) Patent No.: US 11,115,556 B2
(45) Date of Patent: Sep. 7, 2021

(54) WORK FORM SHARING

(71) Applicant: Hewlett-Packard Development Company, L.P., Spring, TX (US)

(72) Inventors: Hyeong Ju Kim, Seongnam-si (KR); Jung Mo Hong, Seongnam-si (KR); Yong Goo Chung, Seongnam-si (KR); Chang Wook Yoon, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/968,959

(22) PCT Filed: Sep. 4, 2018

(86) PCT No.: PCT/KR2018/010252
§ 371 (c)(1),
(2) Date: Aug. 11, 2020

(87) PCT Pub. No.: WO2019/182208
PCT Pub. Date: Sep. 26, 2019

(65) Prior Publication Data
US 2020/0404117 A1    Dec. 24, 2020

(30) Foreign Application Priority Data

Mar. 20, 2018  (KR) .................. 10-2018-0032326

(51) Int. Cl.
*H04N 1/00*   (2006.01)

(52) U.S. Cl.
CPC ....... *H04N 1/00949* (2013.01); *H04N 1/0097* (2013.01); *H04N 1/00472* (2013.01); *H04N 1/00973* (2013.01); *H04N 2201/0094* (2013.01)

(58) Field of Classification Search
CPC .......... H04N 1/00949; H04N 1/00472; H04N 1/0097; H04N 1/00973; H04N 2201/0094; G03G 15/5079; G06F 8/61
(Continued)

(56) References Cited

U.S. PATENT DOCUMENTS

| 8,613,001 B2 | 12/2013 | Kong |
| 2004/0216058 A1 | 10/2004 | Chavers et al. |

(Continued)

FOREIGN PATENT DOCUMENTS

| JP | 2006-350529 A | 12/2006 |
| JP | 2009-146244 A | 7/2009 |
| JP | 2017-123610 A | 7/2017 |

OTHER PUBLICATIONS

Omori, Tetsuhiko; JP 2009-146244; File Distribution System, File Distribution Method, Program and Recording Medium; Published Jul. 2, 2009; Ricoh Co LTD; Cited paragraphs of the English Translation.*

*Primary Examiner* — Neil R McLean
(74) *Attorney, Agent, or Firm* — Jefferson IP Law, LLP (57) ABSTRACT

An image forming apparatus including a user interface device, a communication interface, a processor, and a memory storing instructions executable by the processor is provided. The processor may execute the instructions stored in the memory to, when an additional application that is not a default application basically installed in the image forming apparatus is included in a workform that is to be shared with an external apparatus, the workform being selected via the user interface device, transmit, to the external apparatus via the communication interface, installation file information of the additional application with the workform that is to be shared.

16 Claims, 7 Drawing Sheets (58) Field of Classification Search
USPC .......................................................... 358/1.13
See application file for complete search history.

(56) References Cited

U.S. PATENT DOCUMENTS

| | | | |
|---|---|---|---|
| 2011/0055832 A1* | 3/2011 | Choi | G06F 3/1205 |
| | | | 718/100 |
| 2013/0021652 A1 | 1/2013 | Yoon | |
| 2013/0063772 A1* | 3/2013 | Bae | H04N 1/00949 |
| | | | 358/1.15 |
| 2013/0198309 A1 | 8/2013 | Muller et al. | |
| 2016/0065788 A1* | 3/2016 | Hosoda | H04N 1/4433 |
| | | | 358/1.13 |
| 2016/0182757 A1 | 6/2016 | Yoo | |
| 2016/0337543 A1 | 11/2016 | Kano | |

\* cited by examiner

| Package Name list | flag |
|---|---|
| com.a.a.a | true |
| com.a.a.b | true |
| com.a.a.c | true |
| com.a.a.d | true |
| com.b.c.a | |
| com..a.b.c | |
| com.c.a.b | |
| com.c.b.a | |

WORK FORM SHARING

BACKGROUND ART

An image forming apparatus, such as a printer, a copier, a fax machine, and a multifunction printer, provides a user interface (UI) that allows a user to request execution of a functions of the image forming apparatus. Types of applications installed in an image forming apparatus differ according to the type of image forming apparatus or users' needs, and thus, functions provided on UIs of image forming apparatuses may be different from each other.

DISCLOSURE OF INVENTION

Brief Description of Drawings

The above and other aspects, features, and advantages of certain examples of the present disclosure will be more apparent from the following description taken in conjunction with the accompanying drawings, in which.

Throughout the drawings, it should be noted that like reference numbers are used to depict the same or similar elements, features, parts, components, and structures and thus, a repeated description thereof may be omitted.

MODE FOR THE INVENTION

Hereinafter, various examples will be described with reference to the accompanying drawings. In this regard, the examples may have different forms and should not be construed as being limited to the descriptions set forth herein. In order to further clearly describe features of the examples, descriptions of other features that are well known to one of ordinary skill in the art are omitted here.

Expressions such as "at least one of," when preceding a list of elements, modify the entire list of elements and do not modify the individual elements of the list.

Figure 1:
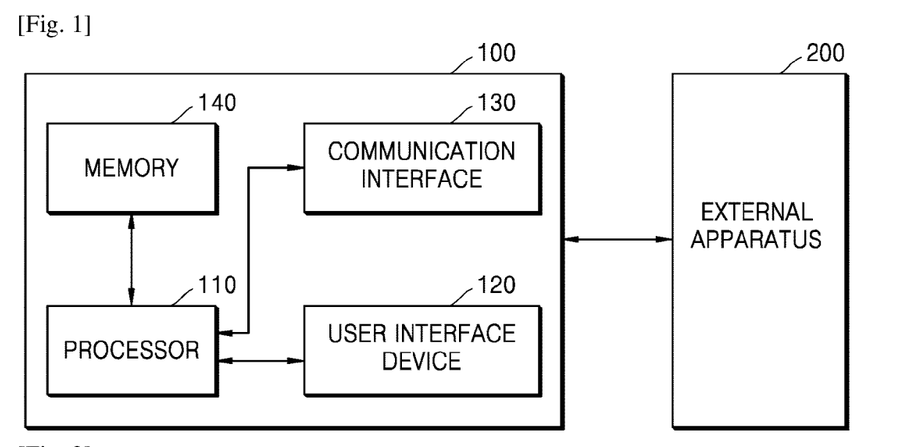
FIG. 1 is a diagram illustrating an image forming apparatus and an external apparatus connected to the image forming apparatus, according to an example.

FIG. 1 is a diagram illustrating an image forming apparatus and an external apparatus connected to the image forming apparatus, according to an example.

Referring to FIG. 1, the image forming apparatus 100 may perform an image forming operation such as printing, copying, scanning, or faxing. The image forming apparatus 100 may form an image on a recording medium such as a printing paper by using various printing methods such as an electro-photography method, an inkjet method, a thermal transfer method, a thermal printing method, or the like. The external apparatus 200 may be an image forming apparatus, or a computing apparatus such as a smartphone, a personal computer (PC), or the like.

The image forming apparatus 100 may include a processor 110, a user interface device 120, a communication interface 130, and a memory 140.

The processor 110 may control operations of the image forming apparatus 100 and may include at least one processing unit such as a central processing unit (CPU). The processor 110 may control other configurations included in the image forming apparatus 100 to perform an operation corresponding to a user input received via the user interface device 120. The processor 110 may include at least one specialized processing unit corresponding to each function. The processor 110 may execute a program stored in the memory 140, may read data or a file stored in the memory 140, or may store a new file in the memory 140.

The user interface device 120 may include an output interface for displaying information regarding an image forming operation or information such as a state of the image forming apparatus 100. The user interface device 120 may further include an input interface for receiving an input for performing an image forming operation from a user. For example, the user interface device 120 may be in a form of a touchscreen including an operation panel for receiving a user input and a display panel for displaying a screen.

The image forming apparatus 100 may be connected to the external apparatus 200 via the communication interface 130. The image forming apparatus 100 may include a module supporting at least one of various wired and wireless communication methods for connection to or communication with the external apparatus 200. Wireless communication may include, for example, at least one of Wireless Fidelity (Wi-Fi), Wi-Fi Direct, Bluetooth, ultra-wideband (UWB), near-field communication (NFC), or the like. Wired communication may include, for example, at least one of Universal Serial Bus (USB), High Definition Multimedia Interface (HDMI), or the like.

The memory 140 may store instructions executable by the processor 110. Various types of data such as a program, an application, or a file may be installed and stored in the memory 140. The memory 140 may also store an operating system.

The image forming apparatus 100 may provide what are considered basic functions such as a printing function, a scanning function, a copying function, a faxing function, a function of sending an email, a storing function, a file transfer protocol (FTP) function, or the like, and a function of monitoring a state of the image forming apparatus 100 such as a function of monitoring a state of toner. Such default functions may be performed by executing a default application installed in the image forming apparatus 100, such as by a manufacturer. The image forming apparatus 100 may separately install an additional application that is not a default application (hereinafter referred to as an additional application) to provide a function other than the default function performed through the default application. For example, by separately installing an application provided by a third party in the image forming apparatus 100, types of functions supported by the image forming apparatus 100 may be extended.

The image forming apparatus 100 may generate a workform to perform operations desired by a user by combining various applications installed in the image forming apparatus 100. To this end, the user may execute a predetermined application provided by the image forming apparatus 100 and thus may generate a workform in the image forming apparatus 100 by selecting various applications installed in the image forming apparatus 100 according to an order of operations desired by the user.

Figure 2:
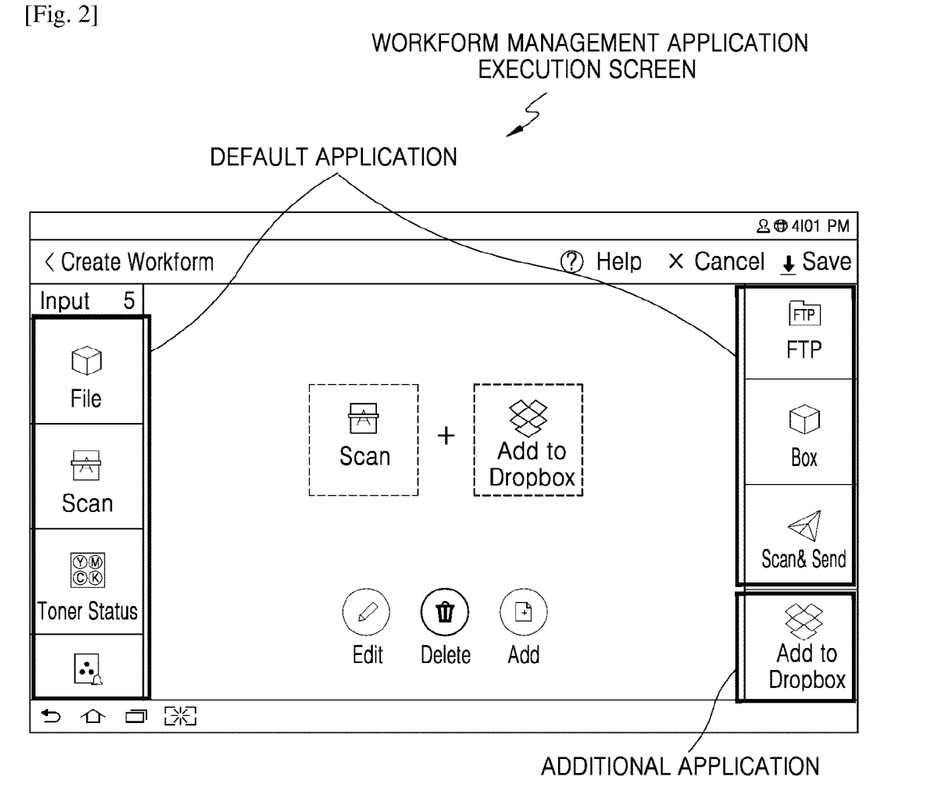
FIG. 2 is a diagram for explaining a process of generating a workform according to execution of a workform management application, according to an example.

FIG. 2 is a diagram for explaining a process of generating a workform according to execution of a workform management application, according to an example.

Referring to FIG. 2, the workform management application may be an application that generates, executes, and/or shares a workform in which applications corresponding to various functions of the image forming apparatus are combined in consideration of order so that the various functions provided by the image forming apparatus 100 are performed in the desired order when the workform is executed. The workform may refer to a result of defining the content and order of operations desired by the user by using applications installed in the image forming apparatus 100.

FIG. 2 illustrates an execution screen of the workform management application. As illustrated in FIG. 2, a list of applications installed in the image forming apparatus 100 may be provided at any desired location of the execution screen, such as on an edge of the execution screen of the workform management application. Not only a default application basically installed in the image forming apparatus 100 but also an additional application separately installed in the image forming apparatus 100 may be provided on the execution screen of the workform management application. Applications may be classified into an input application, a process application, or an output application according to a function and execution result thereof. For example, an execution result of the input application may correspond to an input object of the process application or the output application.

As illustrated in FIG. 2, an example is provided of generating a workform that combines a scan application and an add-to-dropbox application. In the illustrated example, it may be considered that the scan application is a default application that may perform a function of scanning a document. In the illustrated example, it may also be considered that the add-to-dropbox application is an additional application that may perform a function of placing a file in a storage space such as cloud storage to share the file. Accordingly, the workform illustrated in FIG. 2 may perform operations of scanning a document and placing a scanned document file in a predetermined storage space for sharing the file.

When there is an additional application that is installed in the image forming apparatus 100 for function extension, the image forming apparatus 100 may generate a workform by combining a default application and the additional application. In addition, a workform generated in the image forming apparatus 100 may be shared with the external apparatus 200, such as another image forming apparatus. However, even when the image forming apparatus 100 shares the workform with another image forming apparatus of the same type, an additional application that is not a default application may differ according to a use history of each image forming apparatus. Thus, when a workform including the additional application is shared, the shared workform may not be used by the other image forming apparatus if the additional application included in the shared workform is not installed in the other image forming apparatus. Hereinafter, an operation of the image forming apparatus 100 in a case of sharing a workform or receiving a shared workform including an additional application will be described.

Figure 3:
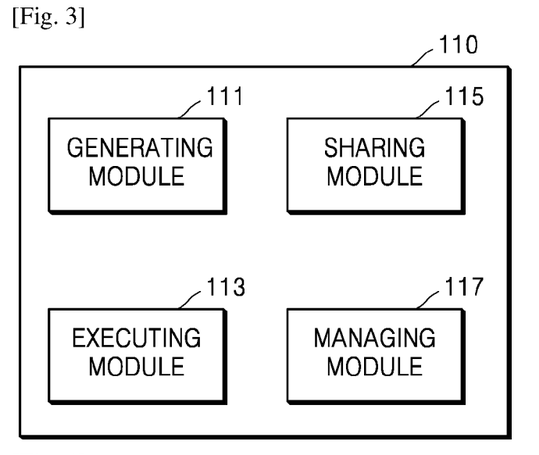
FIG. 3 is a diagram for explaining an operation of a processor, according to an example.

FIG. 3 is a diagram for explaining an operation of a processor, according to an example.

Referring to FIG. 3, the processor 110 may operate in a manner in which a plurality of modules respectively performing predetermined functions operate. For example, the processor 110 may control operations of a generating module 111, an executing module 113, a sharing module 115, and a managing module 117 according to execution of a workform application. Although FIG. 3 illustrates the processor 110 including modules respectively separated for certain functions, some of the modules may be configured as one integrated module.

The generating module 111 may perform an operation of generating a workform.

The executing module 113 may perform an operation of executing a workform.

The sharing module 115 may perform an operation of sharing (e.g., transmitting or receiving) a shared workform. For example, when a workform generated in the image forming apparatus 100 is shared with the external apparatus 200 for use by the external apparatus 200, a workform that is to be transmitted to the external apparatus 200 and installation file information of an additional application may be prepared. As another example, when the image forming apparatus 100 receives a shared workform generated in the external apparatus 200 from the external apparatus 200 for use by the image forming apparatus 100, the image forming apparatus 100 may operate to execute the workform shared by the external apparatus 200 by using the workform received from the external apparatus 200 and installation file information of an additional application. For example, using a package manager of an operating system, the sharing module 115 may install an application of the shared workform that is not installed in the image forming apparatus 100.

The managing module 117 may perform application management and workform management operations according to execution of a workform management application. During execution of the workform management application, the managing module 117 may receive a list of applications installed in the image forming apparatus 100 via the package manager of the operating system, and may check whether or not a workform stored in the memory 140 may be executed. Based on package names of applications, the managing module 117 may distinguish between a default application and an additional application in the application list received via the package manager of the operating system. Based on each application included in a workform, the managing module 117 may also separately manage the workform.

Figure 4:
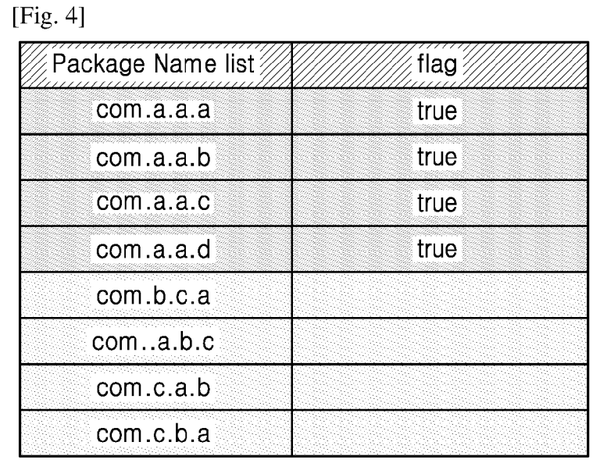
FIG. 4 is a diagram for explaining a method of managing applications included in a workform according to execution of a workform management application, according to an example.

FIG. 4 is a diagram for explaining a method of managing applications included in a workform according to execution of a workform management application, according to an example.

Referring to FIG. 4, the managing module 117 may distinguish between a default application and an additional application that is not a default application, based on package names, in an application list received via a package manager of an operating system. In the application list, the managing module 117 may determine that an application that is not in a package name corresponding to a default application is an additional application, and may distinguish between application types by placing a flag value for an application in the memory 140.

Referring to operations of the processor 110 illustrated in FIG. 3, the processor 110 may execute instructions to share a workform with the external apparatus 200. In that case, when an additional application that is not a default application basically installed in the image forming apparatus 100 is included in a workform that is to be shared with the external apparatus 200, the workform being selected via the user interface device 120, the image forming apparatus 100 may transmit installation file information of the additional application with the workform that is to be shared to the external apparatus 200 via the communication interface 130. During execution of a workform management application, the processor 110 may receive a list of applications installed in the image forming apparatus 100 via a package manager of an operating system, and may check whether or not a workform stored in the memory 140 may be executed. Based on package names of applications, the processor 110 may distinguish between the default application and the additional application in the received application list.

To share a workform with the external apparatus 200, the processor 110 may back up installation file information of an additional application, based on a package name of the additional application, and may transmit backed up installation file information with a workform that is to be shared with the external apparatus 200 to the external apparatus 200. The backed up installation file information of the additional application may correspond to a version of the additional application installed in the image forming apparatus 100. The processor 110 may compress the workform that is to be shared and the installation file information of the additional application together and store a result of the compression as a compressed file. The processor 110 may transmit the compressed file to the external apparatus 200 via the communication interface 130.

In addition, referring to operations of the processor 110 illustrated in FIG. 3, the processor 110 may execute instructions to receive a shared workform from the external apparatus 200. Thus, when an additional application that is not a default application basically installed in the image forming apparatus 100 is included in a workform shared from the external apparatus 200, the processor 110 may install the additional application based on installation file information of the additional application received with the shared workform from the external apparatus 200 via the communication interface 130. The processor 110 may also store the shared workform. During execution of a workform management application, the processor 110 may receive a list of applications installed in the image forming apparatus 100 via a package manager of an operating system, and based on package names of applications, may distinguish between the default application and the additional application installed in the image forming apparatus 100 in the received application list. Accordingly, the processor 110 may determine whether or not an additional application that is not a default application is included in the shared workform, and may determine whether or not the additional application is installed in the image forming apparatus 100.

When an additional application is included in a workform shared by the external apparatus 200, the processor 110 may determine whether or not the additional application is installed in the image forming apparatus 100. When the additional application is not installed in the image forming apparatus 100, the additional application may be automatically installed or may be installed according to a user's input. For example, when the additional application is not installed, a pop-up window asking the user whether to install the additional application or not may be generated, and an input regarding whether to install the additional application or not may be received from the user via the user interface device 120. When installation file information is information for use in installation of the additional application, the processor 110 may request an external server for an installation file of the additional application by using the installation file information, and may receive the installation file of the additional application from the server in response to the request. The processor 110 may install the additional application using the received installation file. The processor 110 may receive a compressed file having the shared workform and the installation file information of the additional application compressed together therein from the external apparatus 200, decompress the compressed file, install the additional application based on decompressed installation information of the additional application, and store a decompressed shared workform.

Figure 5:
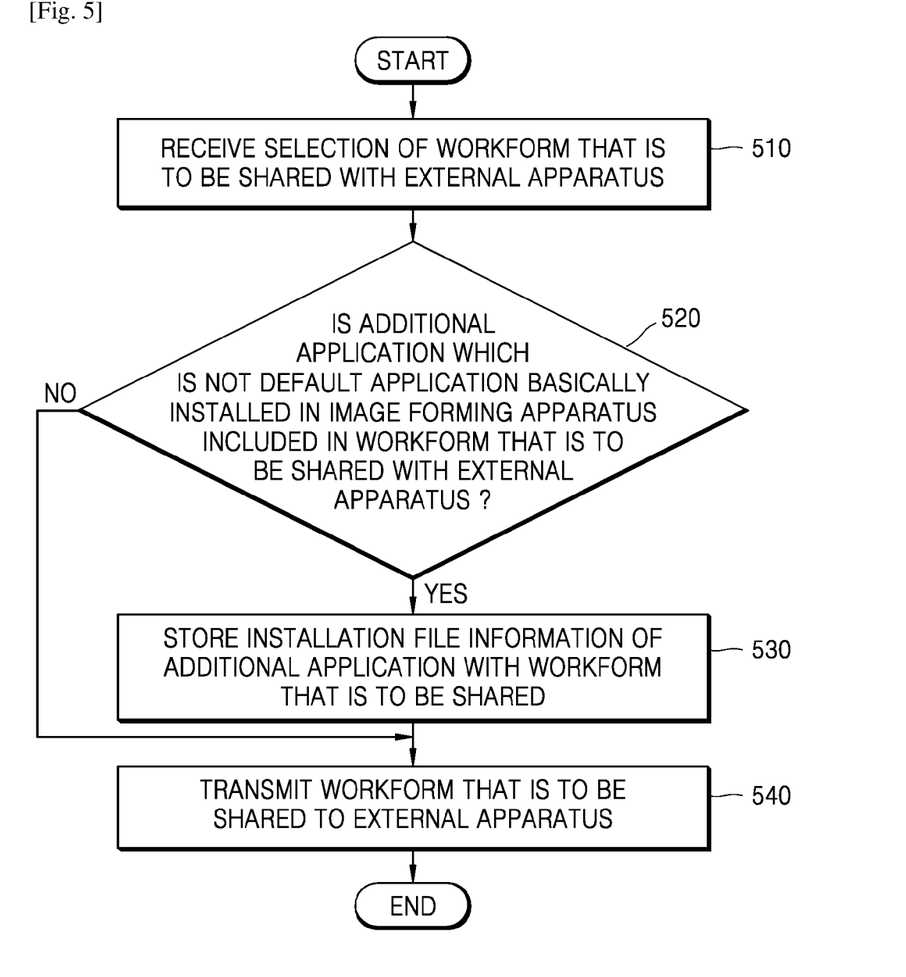
FIG. 5 is a flowchart for explaining a method of sharing a workform with an external apparatus, according to an example.

FIG. 5 is a flowchart for explaining a method of sharing a workform with an external apparatus, according to an example.

Referring to FIG. 5, the image forming apparatus 100 may receive a selection of a workform that is to be shared with the external apparatus 200 in operation 510. For example, by executing a workform management application, the image forming apparatus 100 may receive a selection of a workform that is to be shared with the external apparatus 200 from a user via the user interface device 120. During execution of the workform management application, the image forming apparatus 100 may receive a list of applications installed in the image forming apparatus 100 via a package manager of an operating system, and may check whether or not a workform stored in the memory 140 may be executed. Based on package names of applications, the image forming apparatus 100 may distinguish between a default application and an additional application in the list of applications installed in the image forming apparatus 100.

In operation 520, the image forming apparatus 100 may determine whether or not an additional application that is not a default application basically installed in the image forming apparatus 100 is included in the workform that is to be shared with the external apparatus 200.

In operation 530, when an additional application that is not a default application basically installed in the image forming apparatus 100 is included in the workform that is to be shared with the external apparatus 200, the image forming apparatus 100 may store installation file information of the additional application with the workform that is to be shared. The image forming apparatus 100 may store the installation file information of the additional application together at a location where the workform that is to be shared is stored. The installation file information may be an installation file of the additional application or information for use in installation of the additional application. For example, the information for use in installation of the additional application may be information regarding a path where the installation file of the additional application is located, identification information of the additional application for use in downloading of the additional application, etc.

Figure 6:
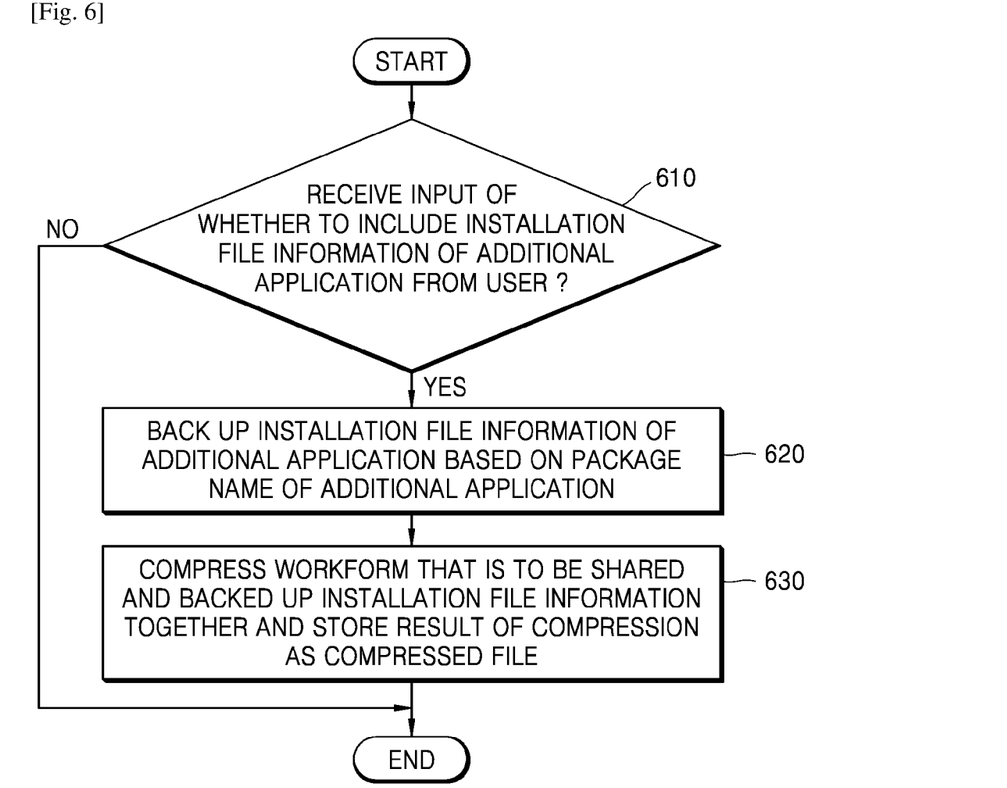
FIG. 6 is a flowchart for explaining a process of storing installation file information of an additional application with a workform that is to be shared with an external apparatus, according to an example.

FIG. 6 is a flowchart for explaining a process of storing installation file information of an additional application with a workform that is to be shared with an external apparatus, according to an example.

Referring to FIG. 6, when an additional application that is not a default application basically installed in the image forming apparatus 100 is included in a workform that is to be shared with the external apparatus 200, the image forming apparatus 100 may receive selection of whether to include installation file information of the additional application in the workform that is to be shared with the external apparatus 200 from a user in operation 610.

Figure 7:
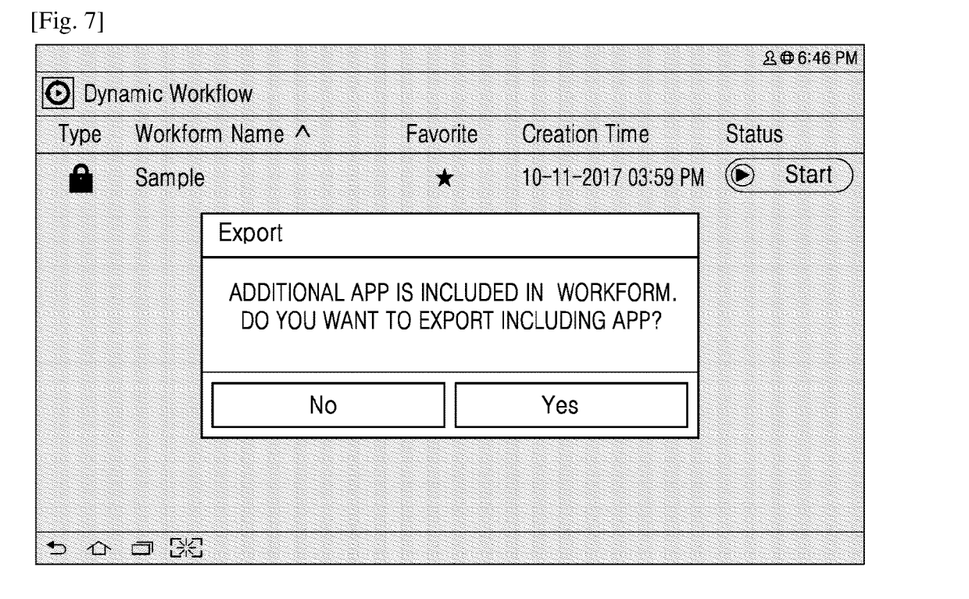
FIG. 7 is a diagram illustrating a screen provided to a user during a process of storing installation file information of an additional application with a workform that is to be shared with an external apparatus, according to an example.

FIG. 7 is a diagram illustrating a screen provided to a user during a process of storing installation file information of an additional application with a workform that is to be shared with an external apparatus, according to an example.

Referring to FIG. 7, the image forming apparatus 100 may generate a pop-up window asking whether to include installation file information of an additional application in a workform that is to be shared with the external apparatus 200 and display the pop-up window on the user interface device 120. The image forming apparatus 100 may receive an input of whether to include installation file information of an additional application or not from a user via the pop-up window displayed on the user interface device 120.

Referring again to FIG. 6, when an input of including installation file information of the additional application is received from the user, the image forming apparatus 100 may back up installation file information of the additional application, based on a package name of the additional application in operation 620. The image forming apparatus 100 may obtain a package name of the additional application, and may back up an installation file of the additional application by using a backup function of an application programming interface (API) based on the package name. The backed up installation file information of the additional application may correspond to a version of the additional application installed in the image forming apparatus 100. When an installation file of the additional application is unable to be backed up, information for use in installation of the additional application, such as path information regarding a path where the installation file of the additional application is located, may be backed up as installation file information to obtain the installation file of the additional application later.

In operation 630, the image forming apparatus 100 may compress together the workform that is to be shared with the external apparatus 200 and the backed up installation file information and store a result of the compression as a compressed file.

Referring again to FIG. 5, the image forming apparatus 100 may transmit the workform that is to be shared to the external apparatus 200 in operation 540. The image forming apparatus 100 may transmit the installation file information of the additional application with the workform that is to be shared to the external apparatus 200 via the communication interface 130. The image forming apparatus 100 may transmit a compressed file having the workform that is to be shared and the installation file information of the additional application compressed together therein to the external apparatus 200. When the additional application is not included in the workform that is to be shared with the external apparatus 200, only the workform that is to be shared may be transmitted to the external apparatus 200 without the installation file information.

Figure 8:
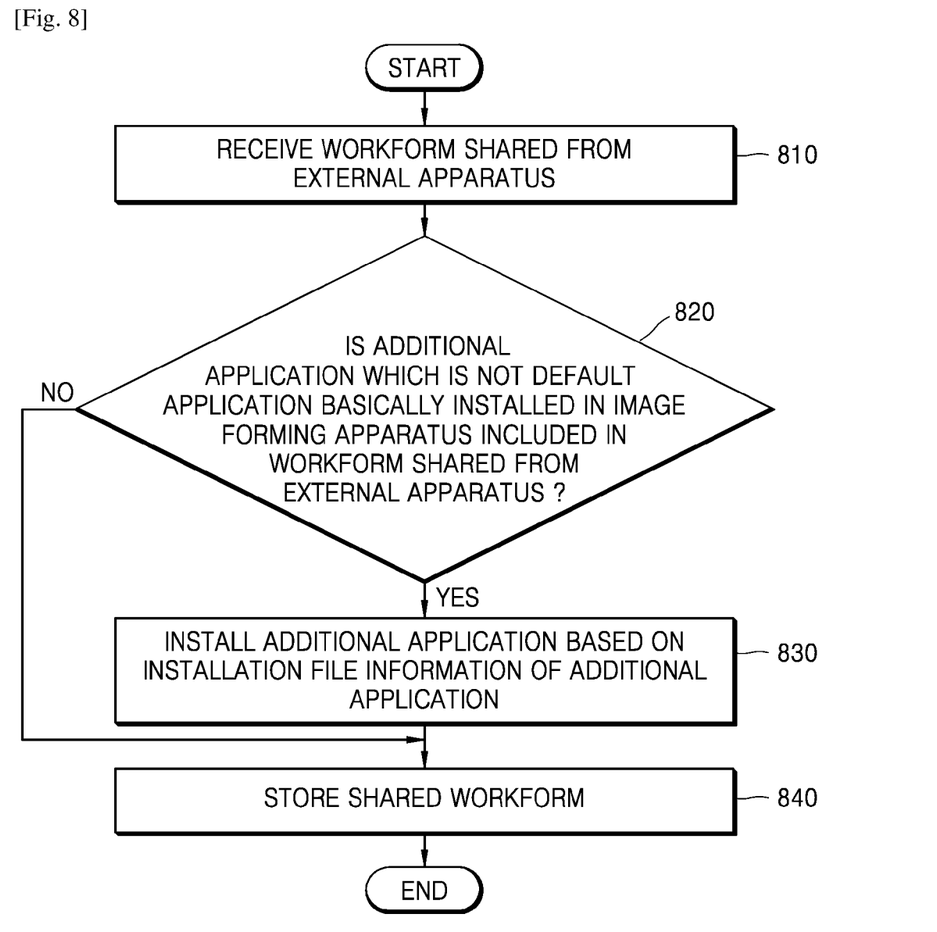
FIG. 8 is a flowchart for explaining a method of sharing a workform by an external apparatus, according to an example.

FIG. 8 is a flowchart for explaining a method of sharing a workform by an external apparatus, according to an example.

Referring to FIG. 8, the image forming apparatus 100 may receive a workform shared from the external apparatus 200 in operation 810. The image forming apparatus 100 may receive installation file information of an additional application with the workform shared from the external apparatus 200 from the external apparatus 200 via the communication interface 130. The image forming apparatus 100 may receive a compressed file having the workform shared from the external apparatus 200 and the installation file information of the additional application compressed together therein from the external apparatus 200, and may decompress the compressed file.

In operation 820, the image forming apparatus 100 may determine whether or not an additional application that is not a default application basically installed in the image forming apparatus 100 is included in the workform shared from the external apparatus 200. For example, during execution of a workform management application, the image forming apparatus 100 may receive a list of applications installed in the image forming apparatus 100 via a package manager of an operating system. Based on package names of applications, the image forming apparatus 100 may distinguish between the default application and the additional application installed in the image forming apparatus 100 in the received application list. Accordingly, the image forming apparatus 100 may determine whether or not an additional application that is not a default application is included in the shared workform. In addition, the image forming apparatus 100 may determine whether or not the additional application is installed in the image forming apparatus 100.

In operation 830, when an additional application that is not a default application basically installed in the image forming apparatus 100 is included in the workform shared from the external apparatus 200, the image forming apparatus 100 may install the additional application based on installation file information of the additional application. The image forming apparatus 100 may install the additional application based on installation file information of the additional application received with the shared workform from the external apparatus 200 via the communication interface 130.

Figure 9:
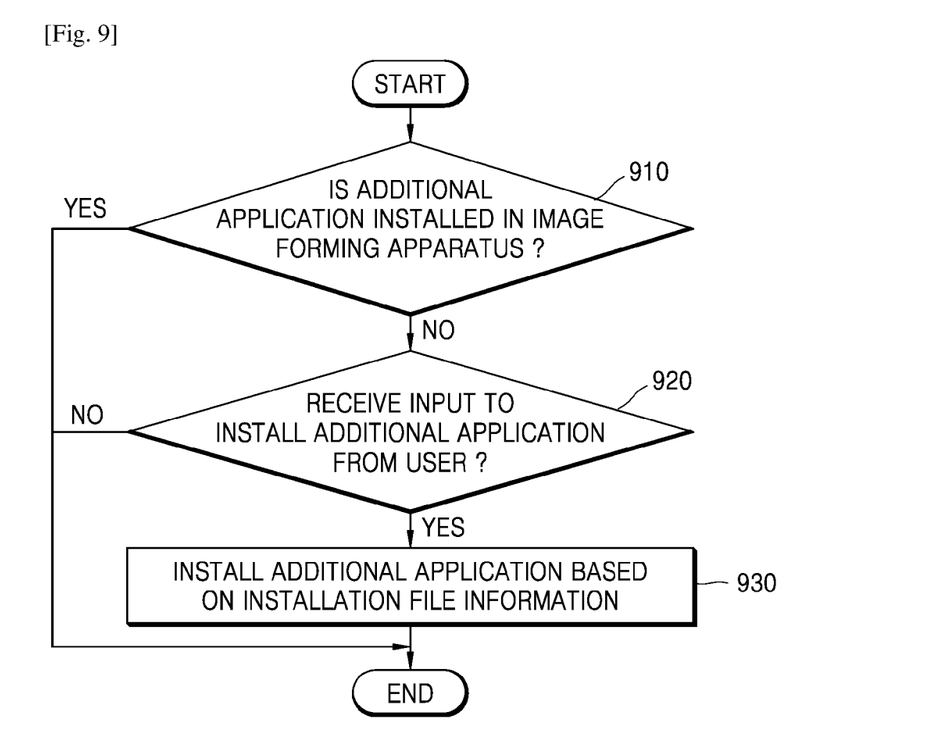
FIG. 9 is a flowchart for explaining a process of installing an additional application based on installation file information of the additional application, according to an example.

FIG. 9 is a flowchart for explaining a process of installing an additional application based on installation file information of the additional application, according to an example.

Referring to FIG. 9, when an additional application is included in a workform shared from the external apparatus 200, the image forming apparatus 100 may determine whether or not the additional application is installed in the image forming apparatus 100 in operation 910.

In operation 920, when the additional application is not installed in the image forming apparatus 100, the image forming apparatus 100 may generate a pop-up window asking a user whether to install the additional application or not. The image forming apparatus 100 may display the generated pop-up window via the user interface device 120, and may receive an input of whether to install the additional application or not from the user. However, according to the user's setting, the additional application may be previously set to be automatically installed without the pop-up window asking whether to install the additional application or not.

In operation 930, when the image forming apparatus 100 determines to install the additional application according to the user's input or the user's setting, the image forming apparatus 100 may install the additional application based on installation file information of the additional application. When the installation file information is not an installation file but information for use in installation of the additional application, the image forming apparatus 100 may request an external server for an installation file of the additional application by using the installation file information. The image forming apparatus 100 may receive the installation file of the additional application from the server in response to the request and install the additional application.

Figure 10:
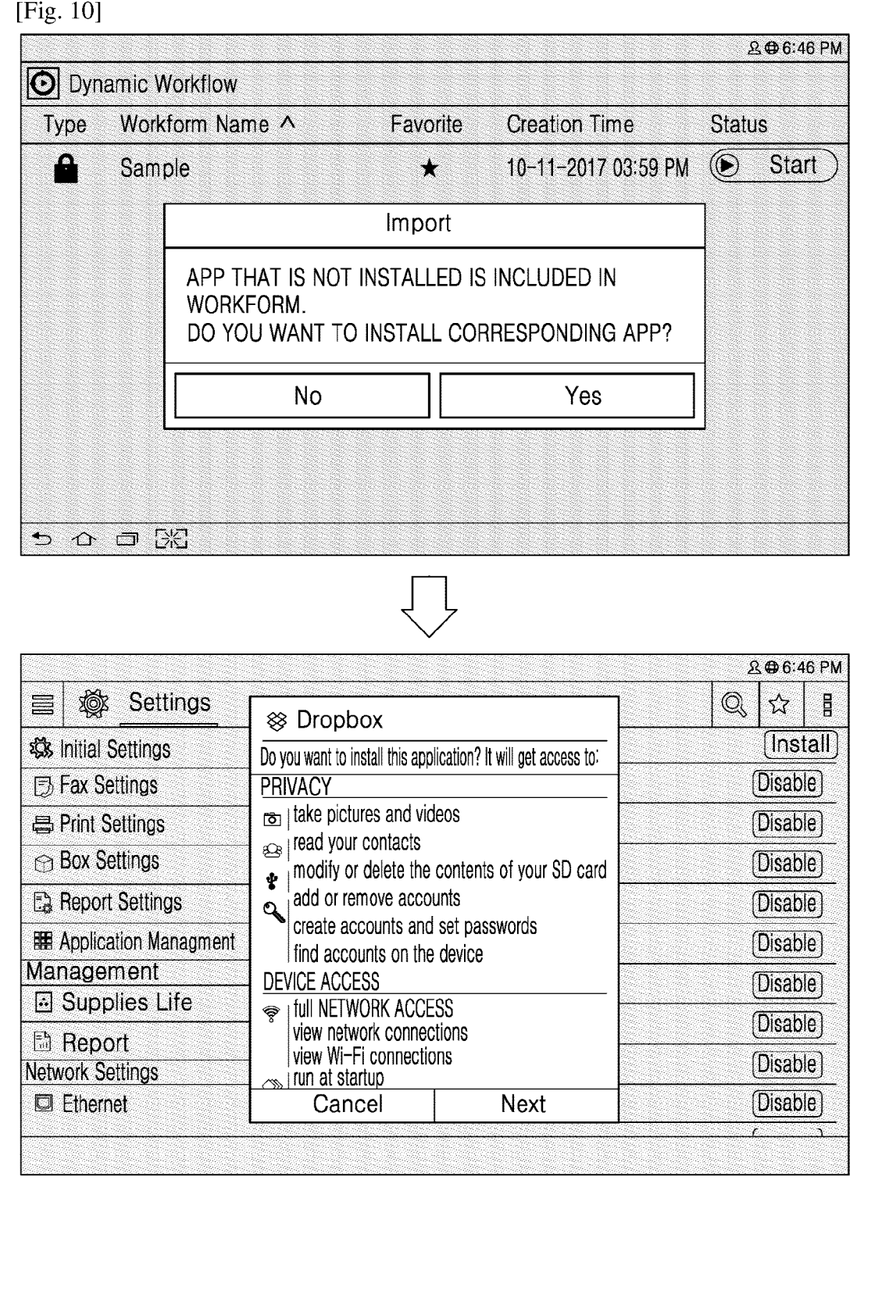
FIG. 10 is a diagram illustrating a screen provided to a user during a process of installing an additional application, according to an example.

FIG. 10 is a diagram illustrating a screen provided to a user during a process of installing an additional application, according to an example.

Referring to FIG. 10, when an additional application is included in a workform shared from the external apparatus 200, and the additional application is not installed in the image forming apparatus 100, the image forming apparatus 100 may display a pop-up window asking a user whether to install the additional application or not via the user interface device 120. When the image forming apparatus 100 determines to install the additional application according to the user's input, the image forming apparatus 100 may display an installation screen of the additional application.

Referring again to FIG. 8, the image forming apparatus 100 may store the shared workform in operation 840. The image forming apparatus 100 may execute the shared workform by using the workform management application.

A workform sharing method of the image forming apparatus 100 described above may be implemented in a form of a computer-readable storage medium storing data or instructions executable by a computer or a processor. The method may be written as a computer program and may be implemented in general-use digital computers that execute the programs using a non-transitory computer-readable storage medium. Examples of the computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disk (SSD), and any devices that may store instructions or software, related data, data files, and data structures and may provide instructions or software, related data, data files, and data structures to a processor or a computer to allow the processor or the computer to execute instructions.

While the present disclosure has been described with reference to the drawings and particular examples, those of ordinary skill in the art may make various changes and modifications therein without departing from the spirit and scope of the present disclosure. For example, the described techniques may be performed in a different order than the described method, and/or the described components such as systems, structures, devices, and circuits may be united or combined in a different form than the described method or may be replaced or substituted by other components or equivalents thereof.

The invention claimed is:

1. An image forming apparatus comprising:
a user interface device;
a communication interface;
a processor; and
a memory storing instructions executable by the processor, wherein, when executed by the processor, the instructions cause the processor to, when an additional application that is not a default application installed in the image forming apparatus is comprised in a workform to be shared with an external apparatus, the workform being selected via the user interface device, back up installation file information of the additional application based on a package name of the additional application, and transmit, to the external apparatus via the communication interface, the backed up installation file information of the additional application with the workform to be shared.

2. The image forming apparatus of claim 1, wherein the backed up installation file information of the additional application corresponds to a version of the additional application installed in the image forming apparatus.

3. The image forming apparatus of claim 1, wherein, when executed by the processor, the instructions further cause the processor to:
compress the workform to be shared and the installation file information of the additional application together, store a result of the compression as a compressed file, and transmit the compressed file to the external apparatus via the communication interface.

4. The image forming apparatus of claim 1, wherein, when executed by the processor, the instructions further cause the processor to, during execution of a workform management application, receive a list of applications installed in the image forming apparatus via a package manager of an operating system and check whether or not a workform stored in the memory is able to be executed.

5. The image forming apparatus of claim 4, wherein, when executed by the processor, the instructions further cause the processor to distinguish between the default application and the additional application in the received list of applications, based on package names of applications.

6. The image forming apparatus of claim 1, wherein the installation file information includes at least one of an installation file of the additional application or information for use in installation of the additional application.

7. An image forming apparatus comprising:
a communication interface;
a processor; and
a memory storing instructions executable by the processor, wherein, when executed by the processor, the instructions cause the processor to, when an additional application that is not a default application installed in the image forming apparatus is comprised in a workform shared from an external apparatus, determine whether or not the additional application is installed in the image forming apparatus, and, when the additional application is not installed, automatically install the additional application based on installation file information of the additional application received with the shared workform from the external apparatus via the communication interface and store the shared workform.

8. The image forming apparatus of claim 7, wherein, when executed by the processor, the instructions further cause the processor to:
receive, from the external apparatus, a compressed file having the shared workform and the installation file information of the additional application compressed together therein,
install the additional application based on decompressed installation information of the additional application by decompressing the compressed file, and
store the shared workform, which is decompressed.

9. The image forming apparatus of claim 7, wherein, when executed by the processor, the instructions further cause the processor to, during execution of a workform management application, receive a list of applications installed in the image forming apparatus via a package manager of an operating system and distinguish between the default application and the additional application that are installed in the image forming apparatus, in the received list of applications, based on package names of applications.

10. The image forming apparatus of claim 9, wherein, when executed by the processor, the instructions further cause the processor to, based on the default application and the additional application that are installed in the image forming apparatus, which are distinguished by using the received list of applications, determine whether or not the additional application which is not the default application is comprised in the shared workform and determine whether or not the additional application is installed in the image forming apparatus.

11. The image forming apparatus of claim 7, wherein, when executed by the processor, the instructions further cause the processor to, when the installation file information is information for use in installation of the additional application, request an external server for an installation file of the additional application by using the installation file information, receive the installation file of the additional application from the external server in response to the request, and install the additional application.

12. An image forming apparatus comprising:
a communication interface;
a user interface device;
a processor; and
a memory storing instructions executable by the processor, wherein, when executed by the processor, the instructions cause the processor to, when an additional application that is not a default application installed in the image forming apparatus is comprised in a workform shared from an external apparatus:
   determine whether or not the additional application is installed in the image forming apparatus,
   when the additional application is not installed, generate and display a pop-up window on the user interface device asking a user whether to install the additional application,
   receive an input of whether to install the additional application from the user, and
   when the received user input is to install the additional application, install the additional application based on installation file information of the additional application received with the shared workform from the external apparatus via the communication interface and store the shared workform.

13. The image forming apparatus of claim 12, wherein, when executed by the processor, the instructions further cause the processor to:
   receive, from the external apparatus, a compressed file having the shared workform and the installation file information of the additional application compressed together therein,
   install the additional application based on decompressed installation information of the additional application by decompressing the compressed file, and
   store the shared workform, which is decompressed.

14. The image forming apparatus of claim 12, wherein, when executed by the processor, the instructions further cause the processor to, during execution of a workform management application, receive a list of applications installed in the image forming apparatus via a package manager of an operating system and distinguish between the default application and the additional application that are installed in the image forming apparatus, in the received list of applications, based on package names of applications.

15. The image forming apparatus of claim 14, wherein, when executed by the processor, the instructions further cause the processor to, based on the default application and the additional application that are installed in the image forming apparatus, which are distinguished by using the received list of applications, determine whether or not the additional application which is not the default application is comprised in the shared workform and determine whether or not the additional application is installed in the image forming apparatus.

16. The image forming apparatus of claim 12, wherein, when executed by the processor, the instructions further cause the processor to, when the installation file information is information for use in installation of the additional application, request an external server for an installation file of the additional application by using the installation file information, receive the installation file of the additional application from the external server in response to the request, and install the additional application.

* * * * *